July 11, 1933. M. W. OLSEN ET AL 1,917,389
EGG SUPPORTING AND TURNING DEVICE DURING INCUBATION
Filed Aug. 4, 1930   2 Sheets-Sheet 1
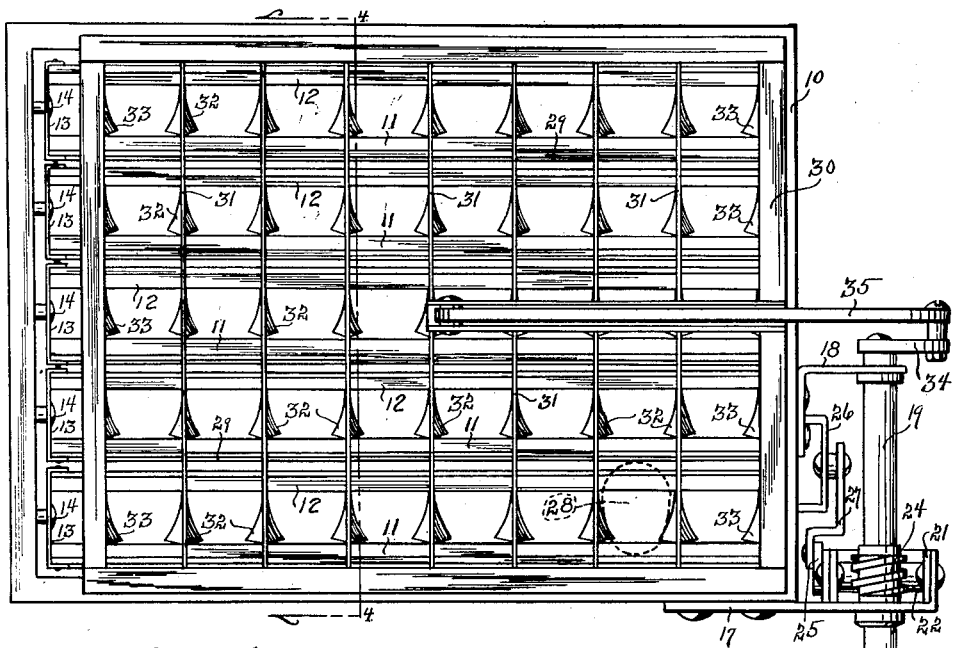
Fig. 1.
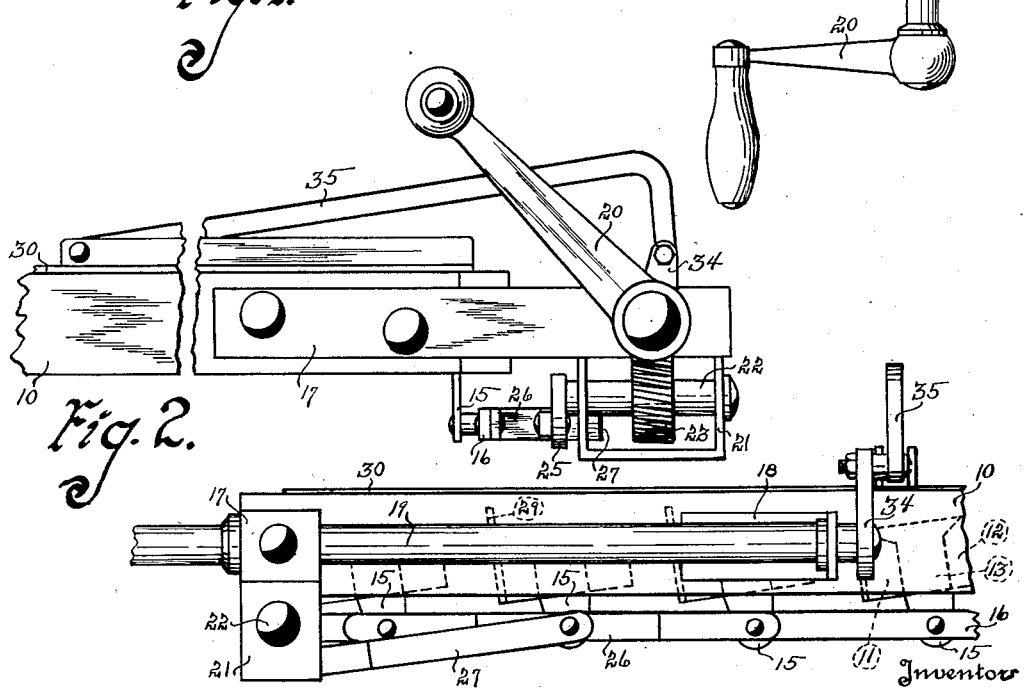
Fig. 2.
Fig. 3.
Inventors
M. W. Olsen
H. J. Baker
By M. Talbert Dick
Attorney

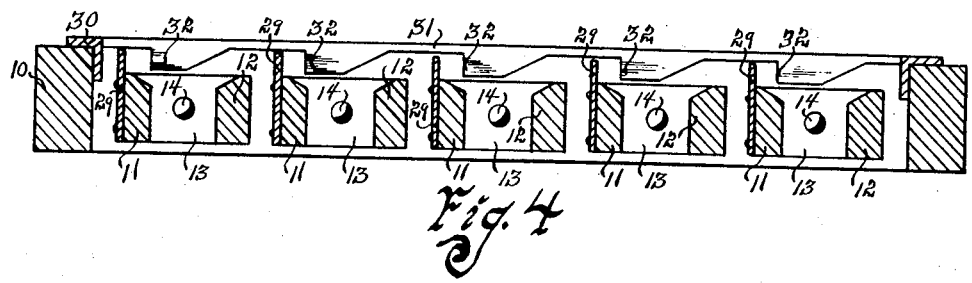
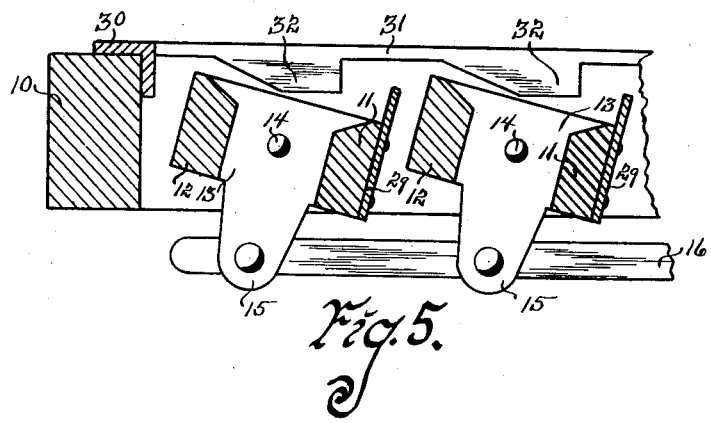
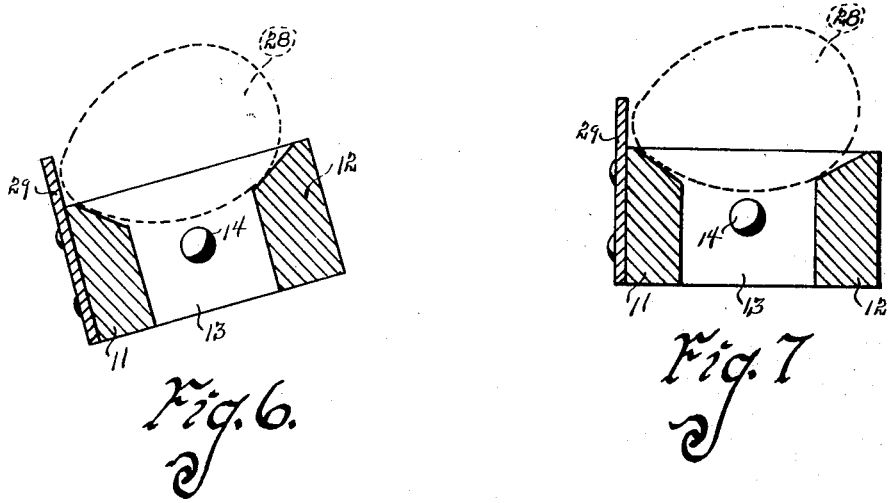

Patented July 11, 1933

1,917,389

UNITED STATES PATENT OFFICE

MARLOW W. OLSEN, OF HARLAN, IOWA, AND HAROLD T. BAKER, OF NEW BRUNSWICK, NEW JERSEY

EGG SUPPORTING AND TURNING DEVICE DURING INCUBATION

Application filed August 4, 1930. Serial No. 472,964.

This invention relates to a device for turning eggs and may be considered as a companion application of our application for a method of turning eggs during the incubation of the same, filed in the United States Patent Office August 4, 1930, Serial No. 472,965.

The principal object of this invention is to provide a mechanical device that will support and turn eggs during incubation with great efficiency, thereby realizing a hatch of fowls from the eggs approaching that obtained by setting hens.

A further object of our invention is to provide a device that will properly hold and turn the eggs during incubation in correct positions, thereby eliminating mal-positions of the fowls inside the eggs during incubation and preventing deformed and crippled fowls when hatched.

A still further object of our invention is to provide an egg supporting and turning device that may be easily installed in incubators already in use.

A still further object of this invention is to provide an egg incubation device that successfully and quickly turns the eggs with a minimum amount of attention and effort on the part of the operator.

A still further object of this invention is to provide an egg supporting and turning device during incubation that will intermittently rotate the eggs at a variation of rotation relative to the preceding amount of rotation of the eggs during the previous movement of the eggs by the device.

A still further object of our invention is to provide an egg supporting and turning device during incubation that is economical in manufacture and durable in use.

These and other objects will be apparent to those skilled in the art.

Our invention consists in the construction, arrangement and combination of the various parts of the device, whereby the objects contemplated are attained as hereinafter more fully set forth, pointed out in our claims and illustrated in the accompanying drawings, in which:

Fig. 1 is a top plan view of our complete egg supporting and turning device ready for use.

Fig. 2 is a rear end view of a portion of the invention and more fully illustrates its construction.

Fig. 3 is a side view of a portion of the operating mechanism of the invention.

Fig. 4 is a cross sectional view of the invention taken on line 4—4 of Fig. 1, with the operating mechanism removed.

Fig. 5 is a cross sectional view of the invention showing the pairs of egg supporting bars in a tilted condition and is taken along the line 4—4 of Fig. 1, looking in the opposite direction.

Fig. 6 is an enlarged sectional view of one of the pairs of egg supporting and tilting bars showing the position of the eggs when the same is tilted to an angle to the horizontal.

Fig. 7 is an enlarged sectional view of one of the pairs of egg supporting and tilting bars showing the position of the eggs when the bars are in a near horizontal position.

In order to appreciate this invention we must consider the embryo fowl inside its shell and its growth of development throughout incubation. The embryo fowl develops its system for using air, food and water while it is inside the shell. The egg is constructed in such a way that the part of the yolk where the germ spot is located is lighter than the opposite side, so that when the egg is at rest, the yolk turns over so that the embryo is always at the top. This line of gravity, of "up and down", is one of the two guides to location for the embryo, the other guiding point being the air cell. These two points of up and towards the air cell are just as important to the embryo fowl as up and to the light is to plants.

After the embryo begins to develop we find the fowl lying on the germ spot straight across the egg with its back up and its left side to the air cell. Later the fowl's head turns to the left side and the body turns to its left side. During this progress the embryo is receiving nourishment by sending out blood vessels on the surface of the yolk and has also developed a membrane on the surface of the yolk connected with the blood vessels, which digest the yolk food and the nourishment is then taken into the blood vessels and carried to the embryo fowl. On the fifth day the fowl needs more oxygen than it can get from the liquids of the egg, so it begins to develop a temporary breathing system. A water supply is also an essential to the embryo fowl. To this end the embryo develops two sacs or coverings which come out from the abdomen at the naval. These two sacs cover the fowl, one inside the other. The inside sac, which covers the fowl's body is filled with $H_2O$ that is drawn from the albument of the egg, so the fowl is floating in this sac of water.

Just outside this water sac is the other sac and between the two is growing out another membrane, a pear-shaped sac which draws up and towards the air cell, stretching out the inside sac as it goes until it reaches the inside shell membrane. This membrane that is growing out and going to the inside shell membrane is a breathing system which supplies the fowl with air. In other words there are three complete sacs, one the yolk or food sac, the albumen sac and the water sac. These sacs will mix together on or about the fourteenth day and the fowl will have reached such a length that it can no longer remain across the egg, and, therefore, swings around with its body the long way in the egg. Gravity plays an important part in the changing position of the embryo in the egg from crosswise to lengthwise, and the beak of the fowl will be the highest point in the egg. By forcing the egg to remain with the large end, containing the air cell, down, the extra membranes and the fowl are misplaced. Only a very small percentage of fowls can hatch when eggs have remained in this position for any length of time.

It is because of these changes inside the egg that proper turning and positioning of the eggs are necessary in order that the tension and strain on certain tissues may be changed. The turning of the eggs also balances the air circulation and equalizes the temperature. Improper positioning of the eggs cause misplacement of the embryo within the egg, while improper turning causes deformed and crippled fowls. We have provided a device that will correctly support and move eggs during incubation.

We have used the numeral 10 to designate the rectangular frame of the invention. Rotatably mounted in this frame are a plurality of pairs of spaced apart parallel egg supporting and tilting bars. We have designated the two bars that make up each pair of bars by the numerals 11 and 12, respectively. The bars 11 and 12 that make up a pair of bars are spaced apart and held in proper relationship by end members 13 secured to the bars by suitable means. The numeral 14 designates a headed pin loosely extending through the central portion of each of the end members 13 and rigidly secured to the frame 10. By this construction each pair of spaced apart egg supporting and tilting bars 11 and 12 will be rotatively mounted in the frame 10, as shown in the drawings. Integrally formed on each of the end members adjacent the right side of the frame 10 is a downwardly extending arm 15. Pivotally secured to the free end portions of all of these arms 15 is an operating bar 16, as shown in the drawings. By reciprocating this bar 16, the arms 15 will be moved forwardly and backwardly, thereby tilting or rocking each pair of egg supporting bar members. The numerals 17 and 18 designate two bracket members spaced apart and secured to the frame 10. Rotatably mounted in these two bracket members and extending transversely to the bars 11 and 12 is a shaft 19. The numeral 20 designates a crank handle for manually rotating the shaft 19. It will here be noted that this shaft 19 is located outside of the frame 10 and to the right side of the same.

We have used the numeral 21 to designate a downwardly extending U-shaped bearing member secured at the free end of the bracket member 17 and embracing the shaft 19. Rotatably mounted in the bearing member 21 and below the shaft 19 is a second shaft 22, positioned transversely of the shaft 19.

The numeral 23 designates a worm gear on the shaft 22 and secured against independent movement relative to the shaft 22. This worm gear 23 is in engagement with a worm gear 24 rigidly secured on the shaft 19. Rigidly secured on one end portion of the shaft 22 is a crank arm 25. Secured by rivets or the like to the bar 16 is a U-member 26. The numeral 27 designates a link having one end pivotally secured to the U-member 26 and its other end rotatably secured to the crank arm 25.

By such a construction when the crank handle 20 is rotated the bar 16 will be reciprocated and each pair of egg supporting bars will be rocked from a near normal horizontal position. Due, however, to the reduction worm gears 23 and 24, it will require several rotations of the crank handle 20 to rock the pairs of egg supporting bars from one extreme position in their travel to their other extreme position of travel.

The eggs to be incubated are placed in a row on each pair of supporting bars 11 and 12, and each egg bridges the gap between the two bars as shown by dotted lines in Fig. 6 and Fig. 7. In order that the eggs may be properly supported on the bars 11 and 12, we have caused the upper inner marginal edge of each of the bars to be beveled to more closely conform to the outline of the periphery of the eggs. Also by this construction the eggs which are designated by the numeral 28, have more surface contacting and engaging the bars 11 and 12. When placing the eggs on the bars 11 and 12, the large end of the egg should contact the bar 12 which is the bar that extends above the plane of the bar 11 when the operating bar 16 is pushed forwardly. Secured on the outer side of each of the bars 11 and 12 and extending to a height considerably above the bar to which it is secured, is an elongated strip 29 which aids in holding the eggs on the bars 11 and 12 during the rolling and tilting of the eggs by our invention.

By a space existing between each of the bars 11 and 12 the egg resting on the bars will not be contacted to such an extent as to prevent its proper breathing through the egg shell. This construction also permits the necessary heat to engage the eggs completely around the same.

Slidably mounted on the top of the frame 10 is a rectangular frame of L-construction which we have designated by the numeral 30. This frame 30 has its lower portion extending into and engaging the side walls of the frame 10. Due to the fact that its length is less than the length of the frame 10, it is permitted a certain longitudinal reciprocation in and on the frame 10. The numeral 31 designates a plurality of spaced apart bars secured to and extending completely across the frame 30. These bars are transversely arranged relative to the bars 11 and 12. By this construction each egg on each pair of egg supporting and tilting bars 11 and 12 will have a bar 31 at each side of it. On the bottom of each of the bars 31 are a plurality of pairs of downwardly and outwardly extending flared members 32 each extending away from the other with which it is paired, as shown in Fig. 1. These flared members are located directly above the space between each pair of the bar members 11 and 12 and are designed to rest at the two sides of each of the eggs. Similarly flared members 33 are formed on the two lower side portions of the frame 30. Rigidly secured on the forward end of the shaft 19 is a crank arm 34. The numeral 35 designates a link having one end pivoted by suitable means to the frame 30 near its center and its other end rotatably secured to the crank arm 34. This link 35 is bent at a right angle as shown in Fig. 2, in order to rotate with the crank arm 34 without engaging and binding on the frames 10 and 30.

By this arrangement of parts when the crank handle 20 is rotated, the frame 30 will move forwardly and backwardly at each complete revolution of the shaft 19. This procedure will cause the flared egg engaging members 32 and 33 to engage the sides of the eggs 28 and roll them forwardly and backwardly on the supporting bars 11 and 12. By the members 32 and 33 being of flared construction, i. e. extending downwardly and outwardly they will more properly engage the side of the egg and cause it to rotate when the frame 30 is reciprocated. As we have herebefore seen the eggs make good contact with the tops of the bars 11 and 12 and any moving of the eggs on the bars 11 and 12 by the members 32 and 33 will insure the successful rolling of the egg sidewise. The rotating of the shaft 19 will also slowly reciprocate the bars 16 which will cause each pair of egg supporting bars to tilt to an angle to the horizontal, as shown in Fig. 5 and Fig. 6. This longitudinal tilting of the eggs at times is very desirable as we have herebefore seen, and this rocking procedure by the invention is so designed that the large end of the egg is the end that is elevated during the rocking and changing of the longitudinal position of the egg. Due to the reduction gears a longitudinal rocking of the eggs 28 is much slower than the rolling of the eggs by the reciprocation of the frame 30. This means that sometimes the frame 30 will be reciprocated when the pairs of egg supporting bars are in a nearly horizontal position, and sometimes when the egg supporting bars are rocked to various angular positions relative to the horizontal. As the egg supporting bars are rocked to various positions the eggs will roll, in each instance differently upon them, due to the fact that the eggs will be variably engaging the bars 12 relative to the bars 11.

In other words the eggs will roll quite normally on the bars 11 and 12 when the bars 11 and 12 are resting in approximately the same horizontal plane, but when the bars 12 are at a higher plane than the plane of the bars 11, the greater portion of the weight of the eggs will be resting on the bars 11 and due to this more successful contact with the bars 11 than the bars 12, the lower ends of the eggs will act as the traction to the supporting bars and will make a greater amount of rotation when the frame is reciprocated than when the bars 11 and 12 are in a level condition and the frame 30 is reciprocated.

This result is obtained by the lower end of the eggs or the ends of the eggs engaging the bars 11 being much smaller in circumference than the ends of the eggs engaging the bars 12. By this arrangement of parts the eggs will be given an irregular movement each time the shaft 19 makes one complete revolution and will therefore come to rest in a different position than the position they occupied from the previous revolution of the shaft 19.

If it is desired a prime mover may be operatively connected to the shaft 19, but whatever method the shaft 19 should be intermittently rotated many times each day. The reciprocation of the frame 30 should be so constructed that the rotating movement given the eggs will be less than a complete revolution between alternations.

Some changes may be made in the construction and arrangement of our improved egg supporting and turning device during incubation without departing from the real spirit and purpose of our invention, and it is our intention to cover by our claims any modified forms of structure or use of mechanical equivalent which may be reasonably included within their scope.

We claim:

1. In a device of the class described, a frame, a plurality of pairs of parallel spaced apart bars, end members holding and supporting each pair of bars together; each pair of bars adapted to support eggs during incubation, a means for rockably supporting each of said end members to said frame, a means for rocking said end members, a second frame slidably mounted on said first mentioned frame, egg engaging members secured to said second frame, and a means for reciprocating said second frame relative to said first frame.

2. In a device of the class described, a frame, a plurality of pairs of parallel spaced apart bars, end members holding and supporting each pair of bars together; each pair of bars adapted to support eggs during incubation, a means for rockably supporting each of said end members to said frame, a frame slidably mounted for reciprocation on said first mentioned frame, egg engaging bars rigidly secured to said second frame extending transversely of said pairs of bars, and a means for simultaneously moving said second frame relative to said first frame and rocking said end members.

3. In a device of the class described, a frame, a plurality of pairs of parallel spaced apart bars, end members holding and supporting each pair of bars together; each pair of bars adapted to support eggs during incubation, a means for rockably supporting each of said end members to said frame, a frame slidably mounted for reciprocation on said first mentioned frame, egg engaging bars rigidly secured to said second frame extending transversely of said pairs of bars, flared members formed on said last mentioned bars, and a mechanical means for reciprocating said second frame and rocking said end members; said mechanical means so designed as to reciprocate said second frame a plurality of times to each rocking movement of said end members.

4. In a device of the class described, a supporting member adapted to support the small end of an egg, a second supporting member spaced apart from said first member adapted to engage and support the large end portion of the egg, a mechanical means for lowering and raising the said second member relative to said first member, a strip member secured to and extending upwardly from said first member, and a slidably mounted rake member for rolling said egg laterally forth and back on said two supporting members, and a mechanical means connected to said first mentioned mechanical means for reciprocating said rake.

5. In a device of the class described, a frame member, an egg supporting member secured to said frame member and adapted to support one end of an egg, a second egg supporting member secured to said frame member and adapted to support the other end of said egg, a mechanical means for lowering and raising one of said egg supporting members relative to the other said egg supporting member, a rake member slidably mounted on said frame capable of moving said egg forth and back on said two egg supporting members and a mechanical means for reciprocating said rake.

MARLOW W. OLSEN.
HAROLD T. BAKER.